Figure 1:
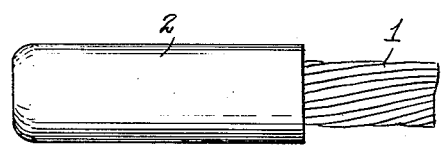

Aug. 16, 1932.  W. A. WHITE  1,872,022

RAIL BONDING

Filed Nov. 8, 1922

INVENTOR.
William A. White.
BY
Fay, Oberlin & Fay
ATTORNEYS

Patented Aug. 16, 1932

1,872,022

UNITED STATES PATENT OFFICE

WILLIAM A. WHITE, OF CLEVELAND, OHIO, ASSIGNOR TO THE ELECTRIC RAILWAY IMPROVEMENT COMPANY, OF CLEVELAND, OHIO, A CORPORATION OF OHIO

RAIL BONDING

Application filed November 8, 1922. Serial No. 599,729.

One method of attaching rail bonds in current use is by means of arc welding, such method of application involving the melting down of a metal pencil, preferably of iron, by means of an electric arc formed between the same and the portion of the rail face adjacent the bond terminal. Despite numerous advantages presented by this method of bonding where the arc welding operation has been successfully accomplished, there are a number of inherent difficulties both to the securing of a satisfactory juncture between the rail and bond terminal, where the body of the bond as usual consists of copper strands or laminæ, and in addition there is the danger that such strands where they enter into the terminal may be so injured as to either reduce the normal conductivity of the bond or lead to premature breakage.

Failure of copper bonds by the breaking of the strands or wires of the copper conductor occurs in all cases close to the contact where the terminal part of the conductor is thus affixed to the rail, this being the point of greatest vibrational stress. The problem of designing a satisfactory bond therefore involves the discovery of a form of terminal that will reduce stress at the point in question to a minimum and at the same time reinforce the strength of the conductor at such point by mechanical means, and above all conserve the original strength and resilience of the strands or wires that compose such conductor.

The foregoing problem is, of course, present in the design of any type of rail bond, irrespective of whether it is to be affixed to the rail by the method of arc welding or otherwise. However, this problem is rendered more complex in the case of a so-called arc weld bond, by reason of the fact that the terminal of such bond should consist of or be provided with a plate or sheath of steel or iron, between which and the surface of the rail the actual weld is formed. It is necessary in the case of such a bond to effect a molecular union of the copper to the iron of the terminal, this requiring the use of a heat process. Now the intensity of the heat of such process is of vital importance in its effect on the strength and resilience of the copper conductor. Heretofore it has been customary to insert the end of the latter through a sleeve-like opening into an iron shell which is open on one side, making the end of the conductor accessible for purposes of welding. A local melting heat is then used to effect the molecular union of copper to iron. As is well known, however, a temperature that approaches at all closely to the melting point of copper will render a copper strand or wire extremely weak and brittle; so that in this case the tightening of the walls of the sleeve opening about the body of the conductor is the only insurance of such a bond against failure by breakage.

Attempts heretofore to effect the desired molecular union, by introducing into the opening of the shell-like terminal a third metal that will amalgamate with the iron and copper and fill the voids, have interfered with other requirements of a satisfactory bond. The filling of voids with a third metal, even if successfully done at an allowable temperature, has led to bulkiness, where small size is desirable, and the operation of filling has not been possible of performance simultaneously with other operations that are essential and when done has precluded the other operations altogether.

The object of the present invention, accordingly, is to provide a bond primarily designed for attachment by arc welding wherein the terminal of the conductor will present a welding surface or face of iron; wherein there will be a molecular union between the copper of such conductor and the iron of such terminal; wherein the area of contact of copper to iron will be in ratio to the sectional area of the conductor as the relative conductivities of the two metals; wherein the form and detail of the iron of the terminal give reinforcement to the strength of the conductor at its weakest point; wherein the form, mass and thickness of the iron of the terminal will be such as to protect the copper locally from the heat of the welding operation, as well as from damage due to inaccuracy of the operator in welding the arc;

and wherein the original strength and resilience of the strands or wires composing the copper conductor will not be impaired.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 2:
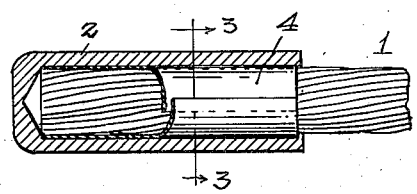
Figure 4:
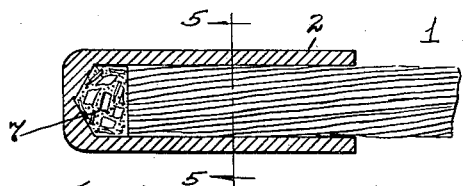
Figures 3, 5:
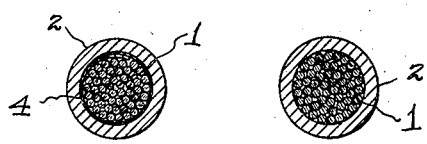
Figure 6:
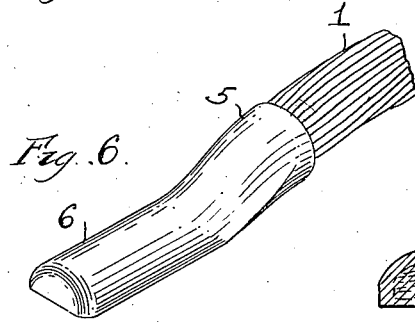
Figure 7:
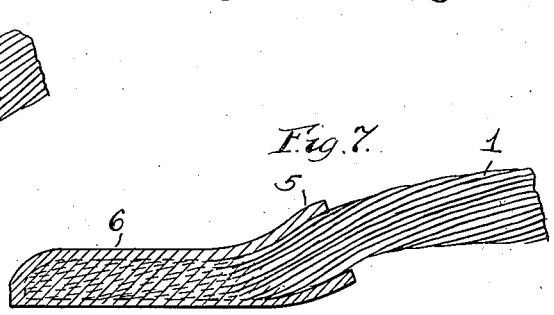
Figure 8:
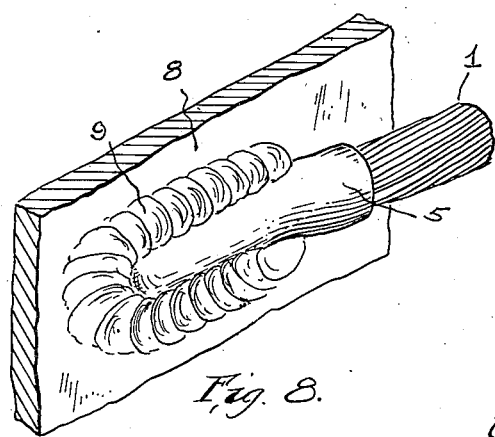

Fig. 1 is a side elevation or plan of one end of a stranded conductor with a terminal of my present improved type fitted thereon, such terminal being in a preliminary stage of manufacture; Fig. 2 is a central longitudinal section of such conductor end and terminal; Fig. 3 is a transverse section of the same, the plane of the section being indicated by the line 3—3, Fig. 2; Fig. 4 is a longitudinal central section, similar to Fig. 2, but showing a modification; Fig. 5 is a transverse section of such modified form, the plane of the section being indicated by the line 5—5, Fig. 4; Fig. 6 is a perspective view of the finished terminal; Fig. 7 is a longitudinal central section through such finished terminal; and Fig. 8 is a perspective view of the finished terminal as applied to a rail or the like by arc welding.

Of the body of the bond 1 or conductor proper, as indicated in the foregoing description of the figures, only one end is shown in such figures. Such bond is shown as composed of strands or wires twisted to form in effect a cable, which may be of any longitudinal extent or bent into such shape as may be required to fit the exigiencies of the particular use to which the bond is to be put. Ordinarily the material of the bond will be copper, or any equivalent highly conductive metal may of course be employed.

In the operation of providing a terminal for such conductor, a close fitting iron or steel tube 2 is pushed over the end of such conductor, the length of the tube being determined by trial to be sufficient for the purpose. Interposed between the inner wall of the tube and the copper of the conductor is a thin lamina or sheet 4 of brass coated with a wash of borax or other similar flux material. Such sheet of brass may be inserted either as a lining for the tube or as a wrapping for the end of the conductor before the latter is introduced into such tube. The conductor end thus prepared is uniformly heated and brought to a temperature at which the brass will begin to soften and amalgamate; whereupon the end of the conductor with the tube thereon is placed in a hammer die or equivalent forging mechanism wherein the major portion of the tube is compressed so as measurably to reduce the volume of such portion. As a result the voids that existed between the strands or wires of the conductor and between the latter and the iron tube or shell will be removed in such portion of the terminal as is thus subjected to the hammering or forging operation, the temperature of the mass being raised by the impact of the hammer and the small amount of braze material used diffusing and disseminating throughout the interior of the terminal not as a filling for voids but as a true brazing or amalgamating medium.

The form and action of the die are chosen so as to tighten the walls of the tube about the strands or wires where the conductor enters such tube, but without actual forging at this point, so as to leave a tight-fitting iron sleeve 5 that precedes the forged terminal 6 proper. Such forged part of the terminal may be left in any desired form by employing a die of appropriate shape and since there is no open side to the iron shell or cover that encases the end of the conductor, the bond may be thus adapted for welding to the rail in any one of several different positions. The forged terminal may, of course, be polished or ground in any usual way to give it a clean and finished surface.

The tube or shell thus applied to the end of the conductor is preferably, although not necessarily, closed at its outer end, as shown in Figs. 2 and 4, and the manner in which such tube or shell is formed from stock is of course a matter of indifference, so far as the present invention is concerned. It has, however, been found practical to make the same from round bars, the cavity being formed by drilling into the end of the bar the required distance and then cutting off such portion.

The use of a closed tube or shell has the advantage that the terminal formed therefrom may be welded at its end as well as at any side, so that the bond is thus adapted to be placed on the rail, or other object to which it is to be attached, in any desired position. Closing of the end of the tube also presents the further advantage in that instead of introducing the brazed material in the form of a sheet 4 that is wrapped about the end of the conductor, such material may be simply dropped into the tube in the form of fragments 7, as shown in Fig. 4, previous to the introduction of the end of the conductor; then when the forging process is reached, the conductor is forced all the way in, through the softened braze material, against the end of the tube or shell, following which the latter is compressed by the blow or blows from the forging hammer. As a result there need be practically no clearance left between the conductor and the inner wall of the tube or shell and a correspondingly solid terminal is produced, i. e. one wherein there will be no voids, either filled or unfilled with braze material, providing the proper minimum clearances are observed and proper manipulation followed in completing the terminal.

The manner in which the terminal, whereof the form shown in Fig. 6, may be attached to the surface of a rail 8, or similar object, is shown in Fig. 8. The terminal is applied with its flattened face against the surface in question and the metal 9 deposited from the arc weld pencil is flowed about the edges of the terminal, thus firmly uniting the latter to the rail.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. A method of forming a rail-bond having a stranded conductor body of copper, which comprises fitting on to the end of such body a tube of higher melting point, including within the end of such tube a small quantity of braze material, heating such terminal until such material has softened, forcing the body end thereinto, and then forging such terminal while hot so as to compact the included strands and substantially eliminate voids.

2. In a method of forming a rail-bond, the steps which consist in fitting onto the end of a stranded conductor body a tube of metal of higher melting point, including in the end of such tube a quantity of braze material, heating the terminal, and forging to compact the strands together, such consolidation diminishing from the end back.

3. In a method of forming a terminal on a rail bond comprising a stranded conductor body of copper, the steps which consists in fitting onto the end of such body a tube of metal of higher melting point approximating that of such rail, including within such tube a small quantity of braze material, heating such terminal until such material has softened, forcing such body endwise into such softened material, and then forging such terminal while hot so as to compact the included strands and substantially eliminate all voids.

Signed by me, this 4th day of November, 1922.

WILLIAM A. WHITE.